(12) United States Patent
Hoop et al.

(10) Patent No.: US 10,201,860 B2
(45) Date of Patent: *Feb. 12, 2019

(54) DRILL BIT WITH AN EXCHANGEABLE CUTTING PORTION

(71) Applicant: Hilti Aktiengesellschaft, Schaan (LI)

(72) Inventors: Matthaeus Hoop, Eschen (LI); Christoph Weber, Neuheim (CH); Thomas Britt, Flums (CH); Christoph Amman, Schaanwald (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,461

(22) PCT Filed: Dec. 20, 2013

(86) PCT No.: PCT/EP2013/077697
§ 371 (c)(1),
(2) Date: Jun. 19, 2015

(87) PCT Pub. No.: WO2014/096366
PCT Pub. Date: Jun. 26, 2014

(65) Prior Publication Data
US 2015/0343540 A1 Dec. 3, 2015

(30) Foreign Application Priority Data

Dec. 21, 2012 (WO) .................. PCT/EP2012/076774
May 8, 2013 (EP) .................................... 13166991

(51) Int. Cl.
*B23B 51/04* (2006.01)
*B23B 31/113* (2006.01)
(Continued)

(52) U.S. Cl.
CPC ........ *B23B 51/0473* (2013.01); *B23B 31/113* (2013.01); *B23B 51/0406* (2013.01);
(Continued)

(58) Field of Classification Search
CPC . B23B 51/04; B23B 51/0473; B23B 51/0466; B23B 2240/04; B23B 2251/02;
(Continued)

(56) References Cited

U.S. PATENT DOCUMENTS 3,382,743 A * 5/1968 Trevathan ........... B23B 51/0406
125/20
3,888,320 A 6/1975 Maxwell
(Continued)

FOREIGN PATENT DOCUMENTS

CN 1128321 A 8/1996
CN 101005913 A 7/2007
(Continued)

OTHER PUBLICATIONS

Machine translation of Japan patent document, JPH1110417 (A), "Fitting structure of rotating tool", Omi K. et al. Jan. 19, 1991.*
(Continued)

*Primary Examiner* — Daniel Howell
*Assistant Examiner* — Chwen-Wei Su
(74) *Attorney, Agent, or Firm* — Crowell & Moring LLP

(57) ABSTRACT

A drill bit is disclosed. The drill bit has a cutting portion having an annular portion, where the annular portion has a first end on which is disposed a cutting element and a second end that includes an outer insertion element and a stop shoulder. The drill bit has a drill shaft portion having a cylindrical drill shaft, where the drill shaft has an inner insertion element with an end face on a side of the drill shaft facing the cutting portion. The outer insertion element and the inner insertion element together form a plug connection (Continued)

in an insertion direction that is parallel to the axis of rotation and the insertion elements are connectable to each other via a pin element that is movable into a slot-shaped recess. The pin element is attached to an outside of the inner insertion element and the outer insertion element has the slot-shaped recess.

22 Claims, 7 Drawing Sheets

(51) Int. Cl.
  *E21B 17/046* (2006.01)
  *B28D 1/04* (2006.01)
  *E21B 10/62* (2006.01)
(52) U.S. Cl.
  CPC .............. *B28D 1/041* (2013.01); *E21B 10/62* (2013.01); *E21B 17/046* (2013.01); *B23B 51/0466* (2013.01); *B23B 2240/04* (2013.01); *B23B 2251/02* (2013.01); *Y10T 408/895* (2015.01); *Y10T 408/8953* (2015.01)
(58) Field of Classification Search
  CPC ................. Y10T 408/94; Y10T 408/95; Y10T 408/8953; B28D 1/146
  USPC ............................................ 125/20; 175/403
  See application file for complete search history.

(56) References Cited

U.S. PATENT DOCUMENTS

| | | | | |
|---|---|---|---|---|
| 3,973,862 A * | 8/1976 | Segal | .................... | B23B 31/113 144/23 |
| 4,474,488 A | 10/1984 | Pinkerton et al. | | |
| 4,941,783 A * | 7/1990 | Maier | .................... | B28D 1/041 175/403 |
| 5,007,777 A * | 4/1991 | Itokazu | ................. | B23B 51/042 408/206 |
| 5,628,376 A | 5/1997 | Kleine | | |
| 5,865,571 A * | 2/1999 | Tankala | ................. | B23B 31/005 408/1 R |
| 2007/0020056 A1 | 1/2007 | Burdick | | |

FOREIGN PATENT DOCUMENTS

| | | | | |
|---|---|---|---|---|
| DE | 39 01 528 A1 | 7/1990 | | |
| DE | 39 37 697 A1 | 5/1991 | | |
| DE | 93 02 468 U1 | 7/1993 | | |
| EP | 0 477 253 131 | 4/1992 | | |
| FR | 2860829 A1 * | 4/2005 | .......... | B23B 31/113 |
| JP | 57-199950 U | 12/1982 | | |
| JP | 59-105311 U | 7/1984 | | |
| JP | 61230825 A * | 10/1986 | | |
| JP | 63-169246 U | 11/1988 | | |
| JP | 2-90006 U | 7/1990 | | |
| JP | 2-224978 A | 9/1990 | | |
| JP | 3-154703 A | 7/1991 | | |
| JP | 4-75812 A | 3/1992 | | |
| JP | 2792836 B2 * | 9/1998 | .......... | B23B 31/113 |
| JP | 11010417 A * | 1/1999 | | |
| JP | 2000198007 A * | 7/2000 | | |
| JP | 2002120218 A * | 4/2002 | | |
| JP | 2007136643 A * | 6/2007 | | |
| RU | 2 237 148 C2 | 9/2004 | | |
| SU | 392240 | 7/1973 | | |

OTHER PUBLICATIONS

Machine translation, Japan patent document, JP 59-105311, Jul. 16, 1984.*
Machine translation, Japan patent document, JP 2007-136643, Miyanaga, M., Jun. 7, 2007.*
PCT/EP2013/077697, International Search Report dated Apr. 4, 2014 (Three (3) pages).
European Search Report dated Apr. 4, 2014, with Statement of Relevancy (Four (4) pages).
U.S. Patent Application, "Cutting Portion for a Drill Bit", U.S. Appl. No. 14/654,456, filed Jun. 19, 2015, Inventor Matthaeus Hoop.
U.S. Patent Application, "Drill Bit with an Exchangeable Cutting Portion", U.S. Appl. No. 14/654,459, filed Jun. 19, 2015, Inventor Matthaeus Hoop.
Chinese Office Action issued in Chinese counterpart application No. 201380072296.1 dated Apr. 25, 2016, with English translation (Fifteen (15) pages).
English translation of Japanese Office Action issued in Japanese counterpart application No. 2015-548634 dated Apr. 20, 2016 (Four (4) pages).
Russian-language Office Action issued in counterpart Russian Application No. 2015129601/02(045662) dated May 30, 2017 (9 pages).
Chinese-language Office Action issued in counterpart Chinese Application No. 201380072296.1 dated Oct. 17, 2017 with English translation (13 pages).

* cited by examiner

DRILL BIT WITH AN EXCHANGEABLE CUTTING PORTION

This application claims the priority of International Application Nos. PCT/EP2013/077697, filed Dec. 20, 2013, PCT/EP2012/076774, filed Dec. 21, 2012, and European Patent Document No. 13166991.3, filed May 8, 2013, the disclosures of which are expressly incorporated by reference herein.

BACKGROUND AND SUMMARY OF THE INVENTION

The present invention relates to a drill bit with an exchangeable cutting portion.

The term "drill bit" includes all drilling tools having a hollow cylindrical drill shaft and a cutting portion with one or more cutting elements, for example, core drill bits and socket drill bits. Depending on the intended application, the drill bits may additionally have elements, for example, a depth stop, which limits the drilling depth.

Drill bits consist of a cutting portion with one or more cutting elements, a drill shaft portion and a receiving portion with an insertion end. The drill bit is mounted in the tool receptacle of a core drilling device via the insertion end and is driven during drilling operation by the core drilling device in a direction of rotation about the axis of rotation. Known drill bits are subdivided into drill bits with an exchangeable cutting portion and drill bits without an exchangeable cutting portion, and a distinction is made between releasable and nonreleasable connections in the case of the drill bits with an exchangeable cutting portion. A connection is referred to as releasable if the connection can be released by the user without destruction, such as, for example, a plug connection, a screw connection or a magnetic connection. A connection is referred to as nonreleasable if the user can release the connection only by destroying it such as, for example, a soldered connection, a welded connection, a riveted connection or an adhesively bonded connection.

With the drill bit disclosed in U.S. Pat. No. 3,888,320 A, the cutting portion and the drill shaft portion are connected to one another by a releasable plug-twist connection. The cutting portion comprises an annular portion, which is connected at a first end to a plurality of cutting elements and has an outer insertion element and an annular stop shoulder at a second end. The drill shaft portion comprises a cylindrical drill shaft which has an inner insertion element and an end face on an end facing the cutting portion. The insertion elements form a plug connection in a plug-in direction parallel to the axis of rotation. The outer insertion element has a plurality of pin elements on the inside, these pin elements being directed radially inward in a plane perpendicular to the axis of rotation. The inner insertion element has a plurality of slot-shaped recesses in an L shape into which the pin elements are inserted. The L-shaped recesses consist of a cross-slot running perpendicular to the axis of rotation and a connecting slot running parallel to the axis of rotation and connecting the cross-slot to a lower edge of the inner insertion element.

With the known drill bits with exchangeable cutting portions, there is an axial clearance between the cutting portion and the drill shaft portion in one direction when the plug-rotational connection is closed. A clearance is formed between the end face of the inner insertion element and the stop shoulder of the outer insertion element so that the transfer of force from the drill shaft portion to the cutting portion takes place exclusively by way of the pin elements.

The clearance also results in the fact that a cooling and rinsing medium is not conveyed completely to the working site but instead can be misguided into the clearance on the inside of the drill bit.

Another disadvantage of the known drill with an exchangeable cutting portion is manifested when the drill bit becomes jammed in the substrate. In the case of drill bits, it often happens that the drill bit becomes jammed in the substrate while drilling and must be released by the operator. To release the jammed drill bit, in the case of stand-guided core drilling devices, the drill bit must be driven in the opposite direction of rotation and a tractive force directed in the direction opposite the drilling direction must be exerted on the drill bit by the drill stand. The operator attempts to free the drill bit from the substrate by manually turning it with the help of a wrench and at the same time pulling with the help of the drill stand. In the case of the L-shaped recesses, there is the risk that the operator might rotate the drill shaft portion about the axis of rotation until the pin element comes to a stop on the connecting slot while at the same time operating the hand wheel on the drill stand, so that the pin element is moved out of the connecting slot. As soon as the plug-twist connection between the cutting portion and the drill shaft portion has been released, the cutting portion must be freed from the substrate in some other way, for example, by removal of the substrate.

The object of the present invention is to develop a drill bit having a replaceable cutting portion with which the stability in drilling and the durability with respect to a tensile load are increased by a drill stand. Furthermore, this should reduce the risk that the plug-twist connection might be opened unintentionally while removing a jammed drill bit from the substrate and the drill shaft portion might be removed from the substrate without the cutting portion.

It is provided according to the invention that the at least one pin element is fastened onto an outer side of the inner insertion element and the outer insertion element has the at least one slot-shaped recess. Then the plug connection and the twist connection of the insertion elements can be closed one after the other or simultaneously.

The plug-twist connection of the insertion elements according to the invention improves the stability and durability of the drill bit with respect to tensile loads. The drill bit portion having the slot-shaped recesses is more susceptible to deformation due to tensile loads than is the drill bit portion to which the pin elements are attached. The arrangement of the slot-shaped recesses on the exchangeable cutting portion has the advantage that the less stable of the two drill bit portions is replaced regularly. The risk of deformation due to tensile loads increases with an increase in the proportion of slot-shaped recesses on the circumference of the insertion element. Since the diameter of the outer insertion element is larger than the diameter of the inner insertion element, more circumference is available for the slot-shaped recesses on the outer insertion element and/or the proportion of recesses on the circumference is lower. The drill bit is more stable when the slot-shaped recesses are provided on the outer insertion element.

Due to the arrangement of the pin elements on the inner insertion element and the arrangement of the slot-shaped recesses on the outer insertion element, the drill bit may be designed to be dense on the inside and the misdirection of a cooling and rinsing medium can be prevented. The cooling and rinsing medium supplied through the insertion end of the drill bit, for example, flows completely past the processing site in the case of a dense drill bit and ensures cooling of the cutting elements and removal of drilling cuttings. The drill bit according to the invention also makes it possible for the operator to monitor the opening and closing of the plug-twist connection. Such monitoring is impossible or can be done only to a limited extent when the slot-shaped recesses are provided on the inner insertion element.

In a preferred embodiment the end face of the inner insertion element in the connected state is in contact with the stop shoulder of the outer insertion element. The transfer of force from the drill shaft portion to the cutting portion takes place via the end face and the stop shoulder in drilling. The risk of deformation of the outer insertion element is reduced when the transfer of force does not take place via the pin elements, so that the drill bit according to the invention has a greater stability. The stop shoulder may be designed to be in the shape of a ring or in the form of an annular portion. Due to flat support of the end face on an annular stop shoulder, the drill bit is designed to be dense on the inside, so that misdirection of the cooling and rinsing medium is prevented. The cooling and rinsing medium supplied via the insertion end of the drill bit, for example, flows completely past the working site and ensures cooling of the cutting elements and removal of drilling fines.

The length of the inner insertion element is especially preferably greater than the length of the outer insertion element. Due to the difference in length between the inner and outer insertion elements, this ensures that the end face of the inner insertion element is in contact with the stop shoulder of the outer insertion element and that there is a defined transfer of force from the drill shaft portion to the cutting portion during drilling.

The length of the outer insertion element especially preferably amounts to at least 18 mm. At a minimum length of 18 mm for the outer insertion element, an adequate durability of the cutting portion is ensured. The slot-shaped recesses can be positioned on the outer insertion element at a height, such that the cutting portion is resistant to the resulting tensile stresses in releasing a jammed drill bit with the help of a drill stand.

The length of the outer insertion element is especially preferably no greater than 28 mm. Up to a length of 28 mm for the outer insertion element, the durability of the cutting portion with respect to tensile loads is improved. Greater lengths for the outer insertion element have little or no influence on the durability of the cutting portion with respect to a tensile load and result only in an increased cost of materials and increased processing.

In a preferred embodiment, the outer and inner insertion elements are designed in the form of a ring, wherein the difference between an inside diameter of the outer insertion element and an outside diameter of the inner insertion element is greater than 0.11 mm. Due to the clearance formed between the outer and inner insertion elements, this ensures that the end face of the inner insertion element comes to rest against the stop shoulder of the outer insertion element. The drill bit is designed to be tight on the inside, so that the supply of a liquid or gaseous cooling and rinsing medium to the cutting elements is ensured. Furthermore, there is a defined transfer of force from the core drilling device to the end face of the drill shaft portion and then to the stop shoulder of the cutting portion.

In a preferred embodiment of the drill bit, three or more pin elements are attached to the outside of the inner insertion element, and the outer insertion element has three or more slot-shaped recesses, such that the number of recesses is greater than or equal to the number of pin elements. With the drill bit according to the invention the transfer of force from the end face of the inner insertion element to the stop shoulder of the outer insertion element and the transfer of torque take place via the pin elements to the outer insertion element. The pin elements here are especially preferably distributed uniformly around the axis of rotation of the drill bit. Due to the uniform distribution of the pin elements, there is no assignment of the pin elements to the recesses, so a pin element may be inserted into each recess.

The number of slot-shaped recesses must be greater than or equal to the number of pin elements. For closing the plug and twist connection, a slot-shaped recess must be provided for each pin element. The design of a drill bit on which the number of recesses is greater than the number of pin elements has the disadvantage that the stability of the cutting portion is unnecessarily reduced. This design is suitable if at all for drill bits with very large diameters, because with these drill bits, the proportion of the recesses on the circumference of the outer insertion element is lower than with drill bits having smaller diameter.

Six pin elements are especially preferably provided on the outside of the inner insertion element, and the outer insertion element has six or more slot-shaped recesses. A twist connection with six pin elements, each having a pin diameter of 6 mm, is suitable for transfer of torque for drill bits with different diameters, for example, 50 mm to 250 mm.

In a preferred embodiment of the drill bit the pin elements have a pin height perpendicular to the axis of rotation such that the pin height amounts to between 68% and 89% of the shaft width of the drill shaft. The width of the inner insertion element is preferably approx. 50% of the width of the drill shaft. With an increase in pin height, the area for transfer of torque is increased. Furthermore, the durability with respect to tensile loads is improved.

The pin elements are especially preferably designed as circular cylinders with a pin radius such that the pin radius is between 2.5 and 5 mm. The transfer of torque from the drill shaft portion to the cutting portion takes place by way of the pin elements and the outer insertion element. The greater the pin radius of the pin elements, the smaller the number of pin elements required for the transfer of torque.

In a preferred embodiment, the slot-shaped recesses have a cross slot perpendicular to the axis of rotation such that the cross-slot is connected by a connecting slot to an upper edge of the outer insertion element. The outer insertion element is designed to be open in the region of the connection slots. The pin elements are inserted through the connecting slot such that the connecting slot may be arranged parallel or obliquely to the axis of rotation. The transfer of torque from the pin element to the outer insertion element takes place in the cross-slot.

The cross-slot preferably has a lower distance from the annular portion of at least 3 mm parallel to the axis of rotation. A minimum distance of 3 mm ensures adequate durability of the cutting portion with respect to a tensile load in releasing a jammed drill bit with the help of a drill stand.

The lower distance of the cross-slot from the annular portion is especially preferably no greater than 5 mm. Up to a distance of 5 mm, the durability of the cutting portion with respect to tensile loads is improved. Greater distances have little or no effect on the durability of the cutting portion with respect to a tensile load and lead only to increased cost of materials and processing.

In a refinement of the drill bit, the cross-slot has a follower region and securing region, wherein the follower region is connected to the connecting slot on a side of the connecting slot that faces the direction of rotation, and the securing region is connected to the connecting slot on a side of the connecting slot facing away from the direction of rotation.

The transfer of torque from the drill bit portion to the cutting portion takes place by way of the pin element and the follower region. The securing region is arranged on the side of the connecting slot opposite the follower region. The securing region reduces the risk that in releasing a jammed drill bit from the substrate, the plug-twist connection between the drill shaft portion and the cutting portion might be unintentionally opened. The operator attempts to free the jammed drill bit from the substrate by turning the drill shaft portion with the help of a wrench about the axis of rotation and at the same time pulling on it with the help of the drill stand. Practice has shown that operator will pull on the drill shaft portion primarily when the pin element is stopped against the cross-slot. If the pin element in the drill bit according to the invention is stopped on the follower region or on the securing region, there is no risk that the plug-twist connection will be opened. In the case of the drill bit according to the invention, the plug-twist connection is opened only when the operator pulls on the drill shaft portion precisely at the moment when the pin element is above the connecting slot. The risk that the plug-twist connection will open unintentionally is greatly reduced in comparison with slot-shaped recesses in an L shape.

The width of the follower region is preferably no less than the pin radius plus 1.5 mm. With this minimum width for the follower region, a sufficient durability of the cutting portion with respect to a tensile load is ensured by a drill stand. The pin elements are in contact with the follower region and do not break out of the follower region.

The width of the follower region is especially preferably no greater than the pin radius plus 3 mm. Up to a width equal to half the pin diameter plus 3 mm, the durability of the cutting portion with respect to a tensile load is improved by a drill stand. Greater widths have little or no influence on the durability of the cutting portion with respect to a tensile load and reduce the stability of the cutting portion unnecessarily.

In a first preferred variant, the width of the follower region and the width of the securing region are the same. The follower region and the securing region have a minimum width of pin radius plus 1.5 mm. This embodiment is recommended in particular for drill bits having large diameters in which the proportion of cross-slots on the circumference is low.

In a second preferred variant, the width of the follower region is greater than the width of the securing region. The follower region and the securing region have a minimum width of pin radius plus 1.5 mm. This embodiment is recommended in particular for drill bits having a small diameter, in which the proportion of cross-slots on the circumference is high.

The height of the connecting slot parallel to the axis of rotation is preferably at least 10 mm. At a height of at least 10 mm, a sufficient durability of the cutting portion with respect to a tensile load is ensured by a drill stand.

The height of the connecting slot parallel to the axis of rotation is especially preferably no greater than 13 mm. Up to a height of 13 mm, the durability of the cutting portion with respect to a tensile load is improved by a drill stand. Greater heights have little or no influence on the durability of the cutting portion with respect to a tensile load due to a drill stand and lead only to increased cost of materials and processing.

In a refinement of the drill bit, the annular portion has a guide portion, wherein the guide portion is in flush contact with an outer edge, an inner edge or an outer and inner edge of the cutting elements parallel to the longitudinal axis. Due to the flush contact of the guide portion with the cutting elements, the guide portion forms a guide for the cutting elements during drilling and thereby stabilizes the cutting elements. The guide may be on the outside of the drill bit over the substrate surrounding the borehole or on the inside of the drill bit over the drill core.

The length of the guide portion parallel to the longitudinal axis is preferably less than 4 mm. A guide portion which is smaller than 4 mm would not interfere much or at all with the supply of a cooling and rinsing medium.

In a preferred embodiment of the drill bit, a lug is arranged on the outside of the inner insertion element, and the outer insertion element has a groove, such that the lug and the groove in the connected state form a form-fitting connection in the axial direction. Due to the additional form-fitting connection between the drill shaft portion and the cutting portion, it is possible to further reduce the risk that the releasable connection between the drill shaft portion and the cutting portion will unintentionally open on removal of a jammed drill bit from the substrate. The design of the form-fitting connecting means as a lug and groove allows a simple and reliable connection which makes it difficult to remove the drill shaft portion from the cutting portion. The holding force of the connection can be adapted to the field of use of the drill bit by way of the geometry of the lug and the groove.

The lug is preferably arranged between the pin elements and the drill shaft in the axial direction, and the groove is arranged at the level of the slot-shaped recesses in the axial direction. Sections having a resilient effect are formed between the slot-shaped recesses of the outer insertion element. The elastic effect can be adjusted by means of the number and the axial height of the slot-shaped recesses and the length of the outer insertion element. To separate the drill shaft portion from the cutting portion, a force is exerted on the end face of the outer insertion element in the axial direction with the help of a tool. Due to the action of the force, the elastic section of the outer insertion element is deflected and the form-fitting connection between the lug and the groove can be released. The greater the distance from the groove to the stop shoulder of the outer insertion element, the greater is the deflection of the elastic section. The groove is especially preferably designed in the form of a ring and is arranged in a plane perpendicular to the axis of rotation. A groove designed in the form of a ring, which is itself arranged at the level of the slot-shaped recesses, supports the elastic effect of the sections of the outer insertion element between the slot-shaped recesses.

The axial direction is defined as a direction parallel to the axis of rotation of the drill bit. In the connected state of the drill bit portions, the axis of rotation of the drill bit coincides with the longitudinal axes of the drill bit portions, the cutting portion and the drill shaft portion. The radial plane is defined as a plane perpendicular to the axis of rotation, and a radial direction is defined as a direction running in the radial plane and intersecting the axis of rotation of the drill bit and/or the longitudinal axis of the drill bit portions.

Exemplary embodiments of the invention are described below with reference to the drawings. These should not necessarily represent the exemplary embodiments drawn to scale and instead the drawings are done in the form of schematic diagrams or in a slightly distorted form wherever this serves the purpose of illustration. With regard to supplemental features from teachings that are directly recognizable from the drawings, reference is made to the relevant prior art. It should be recalled that a variety of modifications and changes can be made with respect to the shape and the detail of an embodiment without deviating from the general idea of the invention. The features of the invention disclosed in the description, the drawings and the claims may be essential to the refinement of the invention either individually or in any combination. Furthermore, any combinations of at least two of the features disclosed in the description, the drawings and/or the claims fall within the scope of the invention. The general idea of the invention is not limited to the precise form or detail of the preferred embodiment that is described and illustrated below nor is it limited to an object that would be restricted in comparison with the object claimed in the claims. With given ranges of dimensions, values within the aforementioned limits should also be disclosed as limit values and may be usable in any way and may also be claimable. For the sake of simplicity, the same reference numerals are used below for identical or similar parts or for parts with identical or similar functions.

DETAILED DESCRIPTION OF THE DRAWINGS

Figure 1A:
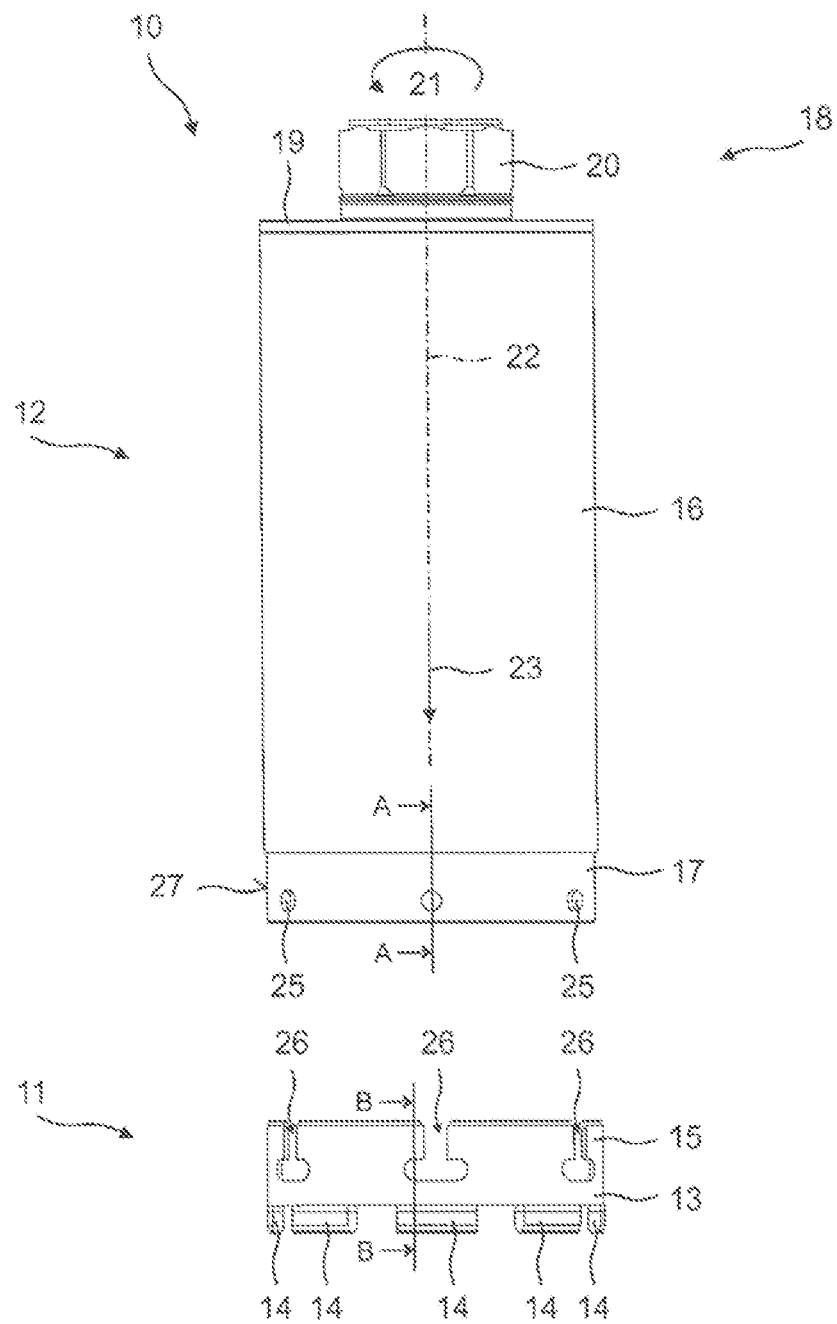
FIGS. 1A, B illustrate a drill bit according to the invention, having a cutting portion and a drill shaft portion in an unconnected state (FIG. 1A) and in a connected state (FIG. 1B)

FIGS. 1A, B show a drill bit 10 according to the invention with a cutting portion 11 that is connected by a releasable plug-twist connection to a drill shaft portion 12. FIG. 1A shows the cutting portion 11 and the drill shaft portion 12 in the unconnected state with the plug-twist connection opened, and FIG. 1B shows the cutting portion 11 and the drill shaft portion 12 in the connected state with the plug-twist connection closed.

The cutting portion 11 comprises an annular portion 13, which is connected to a plurality of cutting elements 14 at its first end and has a first insertion element 15 at its second end. The first insertion element is designed as an outer insertion element 15. The cutting elements 14 are welded, soldered or screwed onto the annular portion 13 or they are attached to the annular portion 13 by some other suitable form of attachment. The cutting portion 11 may also have a single cutting element, which is designed as a cutting sleeve and is connected to the annular portion 13, in addition to having a plurality of cutting elements 14.

The drill shaft portion 12 comprises a cylindrical drill shaft 16 having a second insertion element 17 on an end facing the cutting portion 11 and connected to a receiving portion 18 on an end facing away from the cutting portion 11. The second insertion element is designed as the inner insertion element 17. The receiving portion 18 comprises a cover 19 and an insertion end 20. The drill bit 10 is fastened in the tool receptacle of a core drilling device by means of the insertion end 20. During drilling operation the drill bit 10 is driven by the core drilling device about an axis of rotation 22 in a direction of rotation 21 and is advanced into the substrate to be worked in a drilling direction 23 parallel to the axis of rotation 22. The axis of rotation 22 runs coaxially with a longitudinal axis of the drill shaft 16 and a longitudinal axis of the annular portion 13. The drill bit 10 has a circular cross section perpendicular to the axis of rotation 22. Alternatively, drill bits according to the invention may have other suitable cross sections, for example, a polygonal cross section.

Figure 1B:
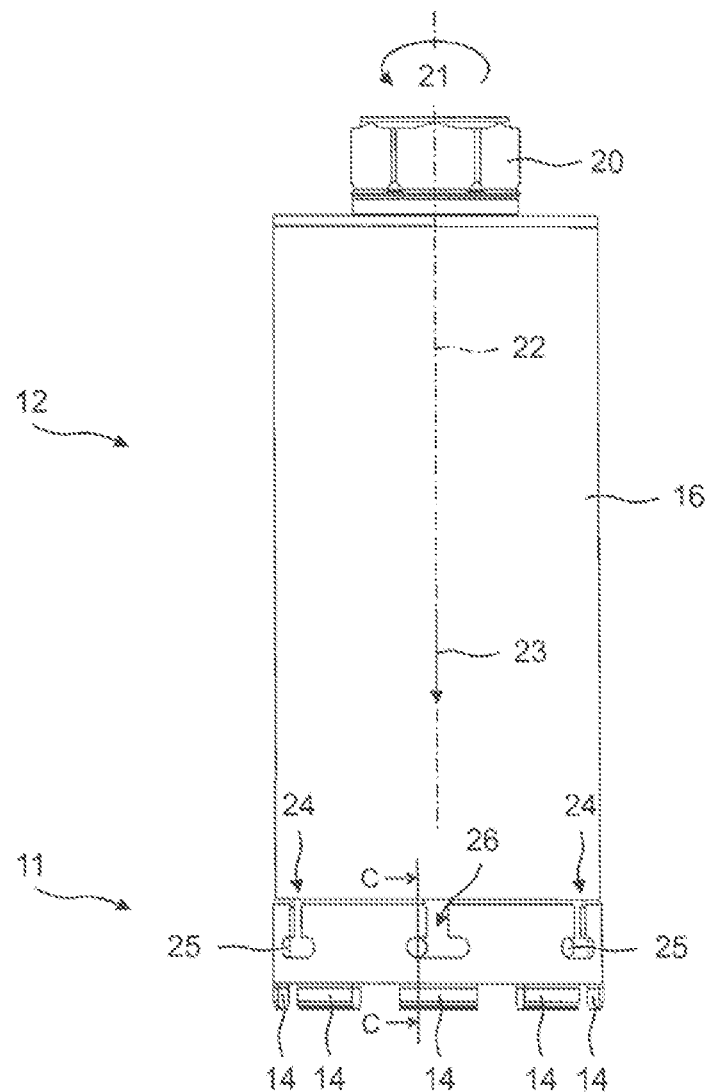

The cutting portion 11 is connected to the drill shaft portion 12 by way of a plug-twist connection 24 (FIG. 1B). Connections of two connecting elements which form a plug connection in at least one direction are referred to as "plug-twist connections," such that the connecting elements plugged together are additionally connected by a twist connection. The plug connection and the twist connection may be closed one after the other or simultaneously. The plug-twist connection 24 must connect the cutting portion 11 and the drill shaft portion 12 to one another in all directions of translation and rotation. The cutting portion 11 must be secured against translation in the drilling direction 23, opposite the drilling direction 23 and radially to the drilling direction 23 as well as being secured against rotation about the axis of rotation 22.

The cutting portion 11 is plugged together with the outer insertion element 15 onto the inner insertion element 17 of the drill shaft portion 12, wherein the insertion direction of the plug connection runs parallel to the axis of rotation 22. The plug connection of the insertion elements 15, 17 secures the cutting portion 11 against translational movements opposite the drilling direction 23 and radially to the axis of rotation 22. The cutting portion 11 must be secured by means of the rotational connection of the insertion elements 15, 17 to prevent rotation about the axis of rotation 22 and to prevent translational movements in the drilling direction 23. The rotational connection comprises six pin elements 25, which are inserted into six slot-shaped recesses 26. The six pin elements 25 are attached to the outside 27 of the inner insertion element 17, and the six slot-shaped recesses 26 are provided in the outer insertion element 15. The pin elements 25 and the recesses 26 are arranged so that they are distributed uniformly around the axis of rotation 22. Due to the uniform distribution, there is no assignment between the pin elements 25 and the recesses 26, and a pin element 25 can be inserted into any recess 26.

The cutting portion 11 can be connected easily and quickly to the drill shaft portion 12 by the operator. To do so, the cutting portion 11 together with the outer insertion element 15 is plugged onto the inner insertion element 17 of the drilling shaft portion 12 so that the pin elements 25 are arranged in the slot-shaped recesses 26. The cutting portion 11 is moved in the plug-in direction and then is secured by rotation about the axis of rotation 22.

Figure 2A:
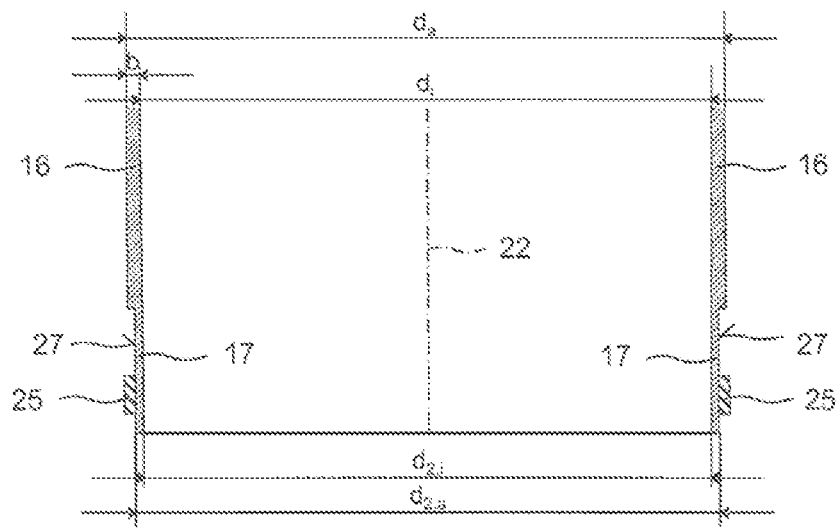
FIGS. 2A, B illustrate the drill shaft portion of the drill bit shown in FIG. 1 in a longitudinal section along the sectional plane A-A in FIG. 1A (FIG. 2A) and the insertion element of the drill shaft portion in an enlarged diagram (FIG. 2B)

FIGS. 2A, B show the drill shaft portion 12 of the drill bit 10 according to the invention in a longitudinal section along the sectional plane A-A in FIG. 1A. FIG. 2A shows the drill shaft portion 12, and FIG. 2B shows the second insertion element 17, which is designed as an internal insertion element, in an enlarged diagram.

The drill shaft portion 12 comprises the cylindrical drill shaft 16 and the inner insertion element 17 which are designed monolithically. As an alternative to the monolithic design, the inner insertion element 17 may be designed as a separate part and is then connected to the drill shaft 16. The pin elements 25 are attached to the outside 27 of the inner insertion element 17. The pin elements 25 and the inner insertion elements 17 may be manufactured from different materials and connected to one another or they are made of the same material, and the pin elements 25 are created by molding methods such as embossing or interpenetrating.

The drill shaft 16 has an outside diameter $d_a$ and an inside diameter $d_i$ perpendicular to the axis of rotation 22 and a drill shaft width b, $b=(d_A-d_I)/2$. The inner insertion element 17 has an outside diameter $d_{2,a}$ and an inside diameter $d_{2,i}$ perpendicular to the axis of rotation 22. The inside diameter $d_{2i}$ of the inner insertion element 17 corresponds to the inside diameter $d_i$ of the drill shaft 16, and the outside diameter $d_{2a}$ of the inner plug element 17 is smaller than the outside diameter $d_a$ of the drill shaft 16, so that an annular step is formed on the outside of the drill shaft portion 12.

Figure 2B:
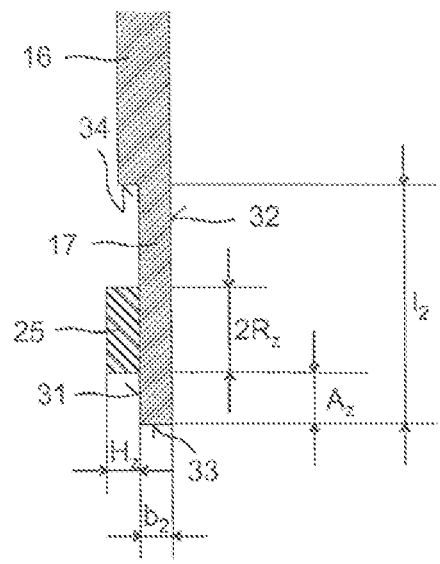

FIG. 2B shows the inner insertion element 17 in an enlarged diagram. The inner insertion element 17 comprises an outer lateral surface 31, an inner lateral surface 32 and an end face 33. There is an annular stop shoulder 34 at the transition from the drill shaft 16 to the inner insertion element 17.

The inner insertion element 17 has a length l parallel to the axis of rotation 22 and a width $b_2$ perpendicular to the axis of rotation 22. The pin element 25 has a circular cylindrical shape with a pin radius $R_z$ parallel to the axis of rotation 22 and a pin height $H_z$ perpendicular to the axis of rotation 22. The lower edge of the pin element 25 runs parallel to the axis of rotation 22 at a distance $A_z$ from the end face 33 of the inner insertion element 17.

Figure 3A:
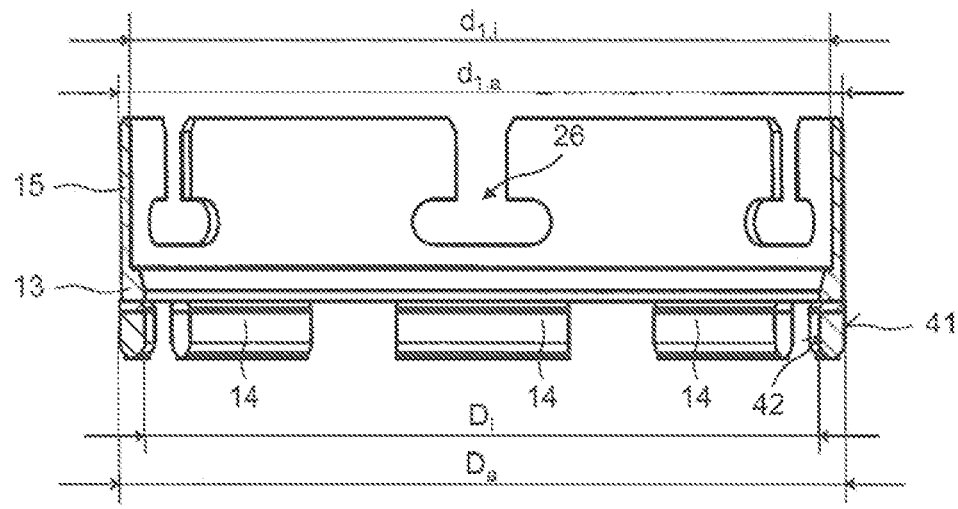
FIGS. 3A, B illustrate the cutting portion of the drill bit shown in FIG. 1 in a longitudinal section (FIG. 3A) and the insertion element of the cutting portion in an enlarged diagram (FIG. 3B)

FIGS. 3A, B show the cutting portion 11 of the drill bit 10 shown in FIG. 1 in a longitudinal section parallel to the plane of the drawing in FIG. 1A. FIG. 3A shows the entire cutting portion 11, and FIG. 3B shows a slot-shaped recess 26 in the outer insertion element 15 in an enlarged diagram.

The cutting portion 11 comprises the annular portion 13, the cutting elements 14 and the outer insertion element 15. The annular portion 13 and the outer insertion element 15 are designed to be monolithic in the embodiment shown here. As an alternative to the monolithic design, the outer insertion element 15 may be designed as a separate part and then connected to the annular portion 13.

The cutting elements 14 are arranged in a ring shape around the annular portion 13 in a plane perpendicular to the axis of rotation 22, and each has an outer edge 41 and an inner edge 42. The outer edges 41 of the cutting elements 14 form an outer circle with an outside diameter $D_a$ and the inner edges form an inner circle with an inside diameter $D_i$. The cutting elements 14 create a borehole in the substrate having a borehole diameter that corresponds to the outside diameter $D_a$. In the interior of the drill bit 10, a drill core with a drill core diameter corresponding to the inside diameter $D_i$ is formed. The outer insertion element 15 has an outside diameter $d_{1,a}$ and an inside diameter $d_{1,i}$ perpendicular to the axis of rotation 22. The outside diameter $d_{1,a}$ of the outer insertion element 15 is smaller than the outside diameter $D_a$, and the inside diameter $d_{1,i}$ of the outer insertion element 15 is larger than the inside diameter $D_i$.

Figure 3B:
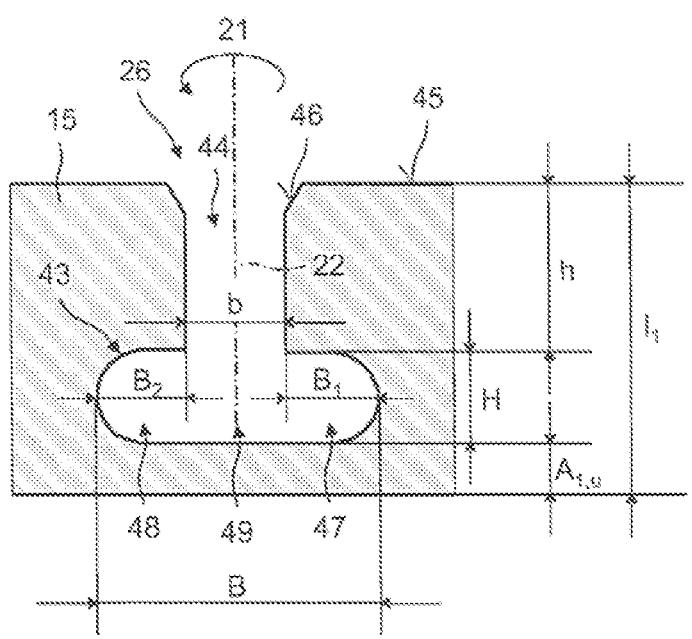

FIG. 3B shows a slot-shaped recess 26 in the outer insertion element 15 in an enlarged diagram. The slot-shaped recess 26 consists of a cross-slot 43, which is arranged perpendicular to the axis of rotation 22, and a connecting slot 44, which is arranged parallel to the axis of rotation 22. The connecting slot 44 connects the cross-slot 43 to an upper edge 45 of the outer insertion element 15, which is designed to be open on the upper edge 45 in the region of the connecting slot 44. The pin elements 25 are inserted into the slot-shaped recess 26 through the connecting slot 44 and are shifted into the cross-slot 43 by turning them around the axis of rotation 22. The torque is transferred from the pin element 25 to the outer insertion element 15 in the cross-slot 43.

Figure 4A:
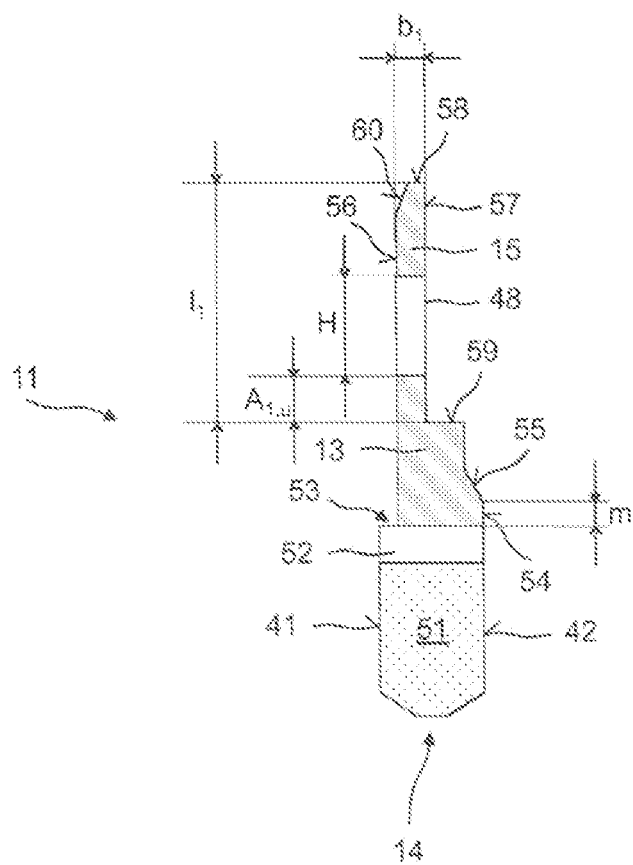
FIGS. 4A, B illustrate the cutting portion in an a longitudinal section along the sectional plane B-B in FIG. 1A (FIG. 4A) and along the sectional plane C-C in FIG. 1B (FIG. 4B)

The outer insertion element 15 has a length $l_1$ parallel to the axis of rotation 22 and a width $b_1$ perpendicular to the axis of rotation 22 (FIG. 4A). The cross-slot 43 has a width B perpendicular to the axis of rotation 22 and a height H parallel to the axis of rotation 22. The connecting slot 44 has a width b perpendicular to the axis of rotation 22 and a height h parallel to the axis of rotation 22. The width b of the connecting slot 44 is greater than the pin diameter $2R_z$ of the pin elements 25, so that the pin elements 25 can be inserted easily into the connecting slot 44. The insertion of the pin elements 25 can be facilitated by an insertion bevel 46 on the upper edge 45. The height h of the connecting slot 44 is selected, so that the cutting portion 11 has a sufficient durability with respect to tensile loads when loosening a jammed drill bit. If the selected height h is too small, there is the risk of deformation of the outer insertion element 15.

The cross-slot 43 has a lower distance $A_{1,u}$ from the annular portion 13 and an upper distance from the upper edge 45 parallel to the axis of rotation 22, wherein the upper distance corresponds to the height h of the connecting slot 44. The lower distance $A_{1,u}$ from the annular portion 13 is selected, so that, due to the drill stand, the cutting portion 11 has a sufficient durability with respect to tensile loads. If the selected lower distance $A_{1,u}$ is too small, there is the risk of deformation of the outer insertion element 15.

The cross-slot 43 comprises a follower region 47, a securing region 48 and a transitional region 49. The follower region 47 and the securing region 48 are arranged on different sides of the connecting slot 44, based on the direction of rotation 21 of the drill bit 10, wherein the follower region 47 and the securing region 48 are connected to the connecting slot 44 by means of the transitional region 49. The follower region 47 is arranged on the side of the connecting slot 44 facing the direction of rotation 21, and the securing region 48 is arranged on the side facing away from the direction of rotation 21. The transfer of torque from the drill shaft portion 12 to the cutting portion 11 takes place by way of the pin elements 25 and the follower region 47. The securing region 48 reduces the risk that the plug-twist connection 24 between the drill shaft portion 12 and the cutting portion 11 is opened unintentionally when loosening a jammed drill bit out of the substrate.

The follower region 47 has a width $B_1$ perpendicular to the axis of rotation 22, the height of the follower region 47 corresponds to the height H of the cross-slit 43. The securing region 48 has a width $B_2$ perpendicular to the axis of rotation 22 and the height of the securing region 48 corresponds to the height H of the cross-slot 43. The widths $B_1$, $B_2$ of the follower region 47 and of the securing region 48 are selected so that the pin elements 25 are held in the cross-slot 43 when there is a tensile load and do not break out.

Figure 4B:
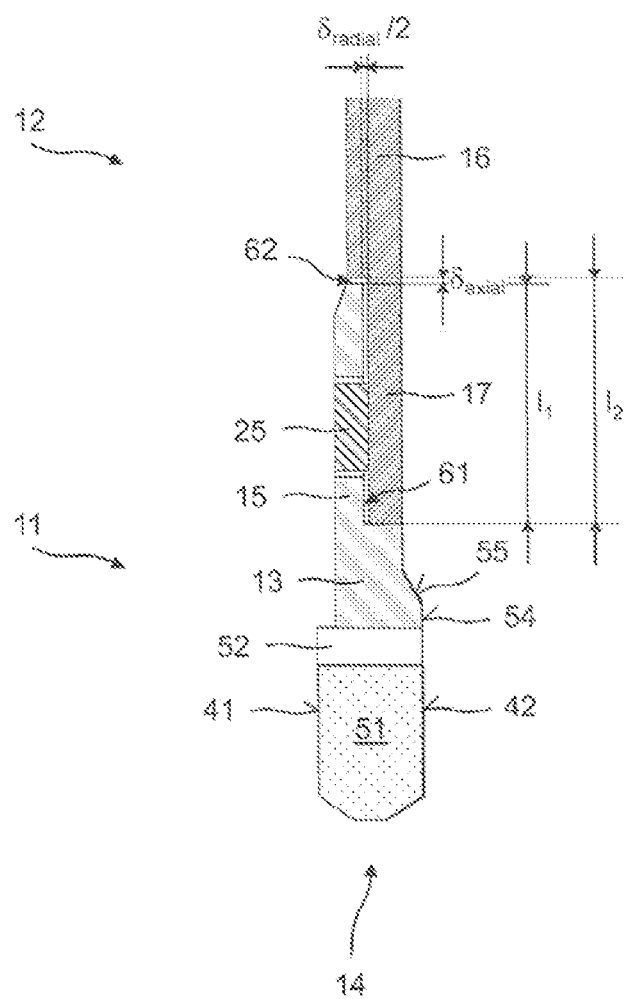

FIGS. 4A, B show the cutting portion 11 of the drill bit 10 according to the invention in a longitudinal section along the sectional plane B-B in FIG. 1A (FIG. 4A) and along the cutting plane C-C in FIG. 1B (FIG. 4B). The cutting portion 11 comprises the annular portion 13, the cutting elements 14 and the outer insertion element 15.

The cutting elements 14 are constructed of a matrix zone 51 and a neutral zone 52, wherein the matrix zone 51 consists of a powder material mixed with abrasive particles and the neutral zone 52 consists of a weldable powder material without any abrasive particles. The two-part design of the cutting elements 14 is necessary to be able to weld the cutting elements 14 to the annular portion 13. The annular portion 13 forms a flush connection to the inner edge 42 of the cutting element 14 and has a setback 53 with respect to the outer edge 41 of the cutting element 14.

The annular portion 13 comprises a guide portion 54 and a core removal section 55 on the inside. The core removal section 55 has an inside diameter which decreases in the direction of the cutting elements 14, and the inclined face of the core removal section 55 supports the removal of the drill core. The guide portion 54 is in flush contact with the cutting element 14 and forms a guide for the cutting elements 14 during drilling, and the guide portion 54 has a length m parallel to the axis of rotation 22. As an alternative to guidance on the inside of the drill bit 10, the guide portion may also be arranged on the outside or on the outside and inside. The length m of the guide portion 54 is smaller than 4 mm. A guide portion smaller than 4 mm causes little or no hindrance to the supply of a cooling and rinsing medium.

The outer insertion element 15 comprises an outer lateral surface 56, an inner lateral surface 57 and an end face 58. At the transition from the annular portion 13 to the outer insertion element 15 there is an annular stop shoulder 59. With the cutting portion 11 shown in FIG. 4A, the outer insertion element 15 additionally has an inclined outer face 60 whose diameter increases in the direction of the cutting elements 14.

FIG. 4B shows the cutting portion 11 and the drill shaft portion 12 which are connected via the plug-twist connection 24, wherein the pin element 25 is arranged in the securing region 48 of the cross-slot 43. In the connected state the drill shaft portion 12 is in contact with the stop shoulder 59 of the cutting portion 11 at its end face 33. Between the inner lateral surface 57 of the outer insertion element 15 and the outer lateral surface 31 of the inner insertion element 17 there is a radial clearance 61. The different $\delta_{radial}$ between the inside diameter $d_{1,i}$ of the outer insertion element 15 and the outside diameter $d_{2,a}$ of the inner insertion element 17 is larger than 0.11 mm for all diameters. The length $l_2$ of the inner insertion element 17 is greater than the length $l_1$ of the outer insertion element 15, so that an axial clearance 62 of the clearance width $\delta_{axial}$ is formed between the end face 58 of the outer insertion element 15 and the stop shoulder 34 of the inner insertion element 17. The radial clearance 61 and the axial clearance 62 ensure that the end face 33 of the inner insertion element 17 is in contact with the stop shoulder 59 of the outer insertion element 15 and during drilling there is a defined transfer of force from the drill shaft portion to the cutting portion.

Figure 5:
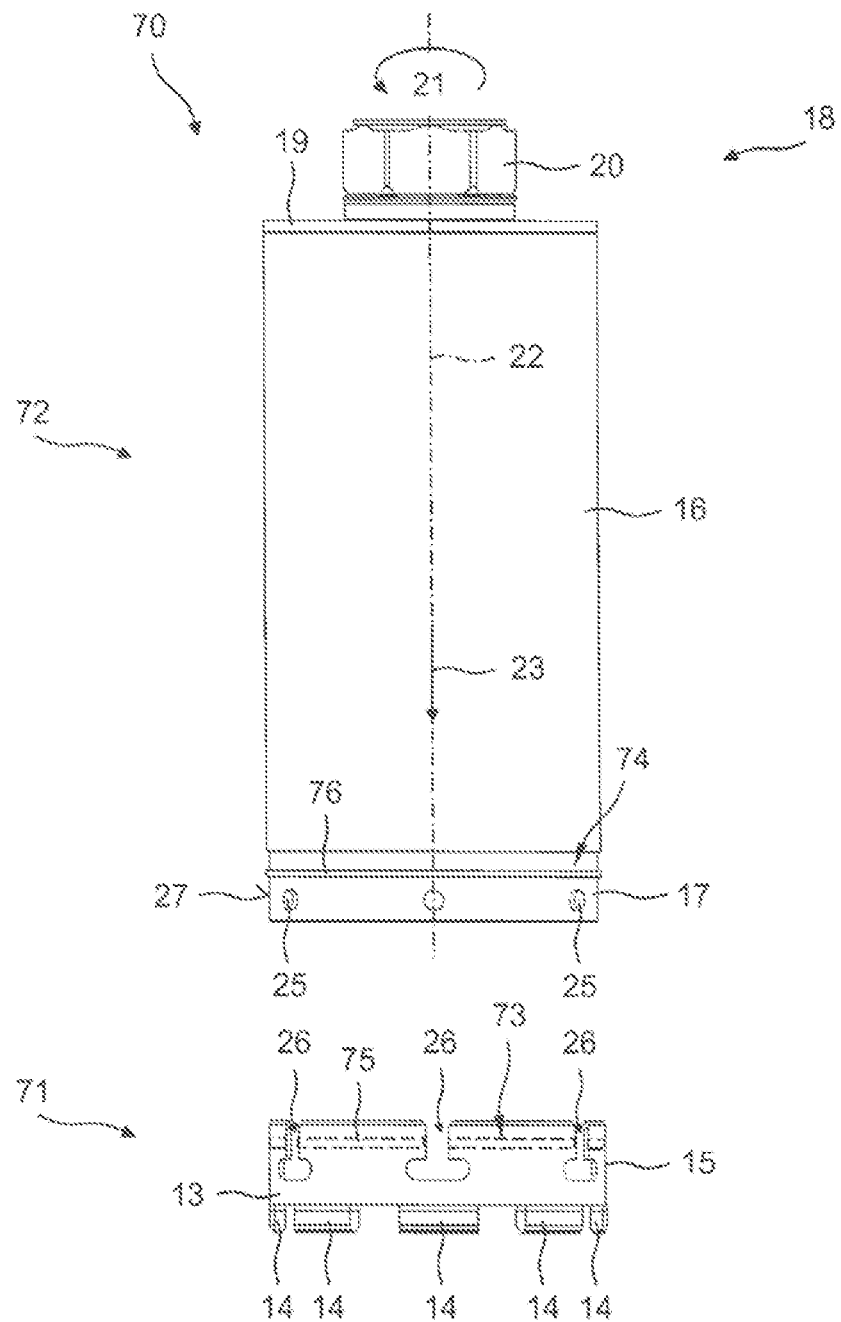
FIG. 5 illustrates another embodiment of a drill bit according to the invention having a cutting portion and a drill shaft portion which are connected in the axial direction by means of an additional form-fitting connection as a withdrawal safety device.

FIG. 5 shows another embodiment of a drill bit 70 according to the invention with a cutting portion 71 and a drill shaft portion 72. The drill bit 70 differs from the drill bit 10 in that an additional form-fitting connection is provided in the axial direction, making it difficult for the cutting portion 71 to be loosened unintentionally from the drill shaft portion 72.

The cutting portion 71 has a first connecting device 73 in addition to the outer insertion element 15 and the slot-shaped recesses 26, and the drill shaft portion 72 has a second connecting device 74 in addition to the inner insertion element 17 and the pin elements 25. The first connecting device 73 comprises a groove 75, which is arranged on the inside 57 of the outer insertion element 15. The second connecting device 74 comprises a lug 76, which is arranged on the outside 28 of the inner insertion element 17 and extends radially outward. In the connected state of the drill bit 70, the lug 76 and the groove 75 form a form-fitting connection between the cutting portion 71 and the drill shaft portion 72 in the axial direction, i.e., in the drilling direction 23. The cutting portion 71 is secured by means of the lug 76 and the groove 75 to prevent the drill shaft portion 72 from being pulled away from the cutting portion 71.

The lug 76 is arranged between the pin elements 25 and the drill shaft 16 in the axial direction. To remove the drill shaft portion 72 from the cutting portion 71, a force is exerted on the end face of the outer insertion element 15 with the help of a tool. By the action of the force, the elastic section of the outer plug element 15 is deflected and the form-fitting connection between the lug 76 and the groove 75 can be released. The greater the distance between the lug 76 and the end face 33 of the inner insertion element 17, the greater is the deflection of the elastic section. The groove 75 is designed in a ring shape and arranged in a plane perpendicular to the axis of rotation 22. A groove with an annular design, arranged in the axial direction at the height of the slot-shaped recesses 26, supports the spring action of the sections of the outer insertion element 15 between the slot-shaped recesses 26.

The holding force which the lug 76 and the groove 75 withstand can be adapted via the geometry of the lug 76 and the groove 75. The engagement of the lug 76 in the groove 75 should be as convenient as possible for the operator and an incline facilitates this engagement. For example, the radial height of the lug 76, i.e., its height in the radial direction, the contact area between the lug 76 and the inner insertion element 17 and the angle of inclination are all suitable as geometric parameters for adjusting the holding force.

The invention claimed is:

1. A drill bit that is rotatable in a rotational direction around an axis of rotation, comprising:
   a cutting portion having an annular portion, a cutting element, an outer insertion element, and an annular limit stop shoulder, wherein the cutting element is disposed on a first end of the annular portion, wherein the outer insertion element is disposed on a second end of the annular portion, and wherein the annular limit stop shoulder is disposed at a transition from the annular portion to the outer insertion element; and
   a drill shaft portion having a cylindrical drill shaft and an inner insertion element, wherein the inner insertion element is connected to the cylindrical drill shaft on a first end of the inner insertion element and has an end face on a second end of the inner insertion element facing the cutting portion;
   wherein the outer insertion element and the inner insertion element together form a plug connection in an insertion direction that is parallel to the axis of rotation and wherein the outer insertion element and the inner insertion element are connectable to each other via a pin element that is movable into a slot-shaped recess;
   wherein the pin element is attached to an outside of the inner insertion element, wherein the slot-shaped recess is formed in the outer insertion element, and wherein in a connected state of the drill bit, the end face of the inner insertion element is in contact with the annular limit stop shoulder of the cutting portion; and
   wherein a lug is disposed on the outside of the inner insertion element, wherein the outer insertion element has a groove, and wherein the lug and the groove form a form-fitting connection in a connected state in an axial direction.

2. The drill bit according to claim 1, wherein a length of the inner insertion element is greater than a length of the outer insertion element.

3. The drill bit according to claim 2, wherein the length of the outer insertion element is at least 18 mm.

4. The drill bit according to claim 3, wherein the length of the outer insertion element is no greater than 28 mm.

5. The drill bit according to claim 1, wherein the outer insertion element and the inner insertion element are formed as a ring, wherein a difference between an inside diameter of the outer insertion element and an outside diameter of the inner insertion element is greater than 0.11 mm.

6. The drill bit according to claim 1, wherein one or more additional pin elements are attached to the outside of the inner insertion element, wherein the outer insertion element has one or more additional slot-shaped recesses, and wherein a number of the slot-shaped recesses is greater than or equal to a number of the pin elements.

7. The drill bit according to claim 1, wherein the pin element has a pin height perpendicular to the axis of rotation that is between 68% and 89% of a width of the drill shaft.

8. The drill bit according to claim 1, wherein the pin element is a circular cylinder with a pin radius that is between 2.5 and 5 mm.

9. The drill bit according to claim 1, wherein the slot-shaped recess has a cross-slot perpendicular to the axis of rotation and wherein the cross-slot is connected to an upper edge of the outer insertion element via a connecting slot.

10. The drill bit according to claim 9, wherein the cross-slot has a distance parallel to the axis of rotation from an edge of the annular portion of at least 3 mm.

11. The drill bit according to claim 10, wherein the distance is no greater than 5 mm.

12. The drill bit according to claim 9, wherein a height of the connecting slot parallel to the axis of rotation is at least 10 mm.

13. The drill bit according to claim 12, wherein the height of the connecting slot parallel to the axis of rotation is no greater than 13 mm.

14. The drill bit according to claim 9, wherein the cross-slot has a follower region and a securing region, wherein the follower region is disposed on a first side of the connecting slot and wherein the securing region is disposed on a second side of the connecting slot.

15. The drill bit according to claim 14, wherein a width of the follower region is no less than a radius of the pin element plus 1.5 mm.

16. The drill bit according to claim 15, wherein the width of the follower region is no greater than the radius of the pin element plus 3 mm.

17. The drill bit according to claim 14, wherein a width of the follower region and a width of the securing region are equal.

18. The drill bit according to claim 14, wherein a width of the follower region is greater than a width of the securing region.

19. The drill bit according to claim 1, wherein the annular portion has a guide portion, wherein the guide portion is in flush contact with an outer edge, an inner edge, or the outer edge and the inner edge of the cutting element parallel to the longitudinal axis.

20. The drill bit according to claim 19, wherein a length of the guide portion is less than 4 mm parallel to the axis of rotation.

21. The drill bit according to claim 1, wherein the lug is disposed between the pin element and the drill shaft in the axial direction and wherein the groove is disposed at a height of the slot-shaped recess in the axial direction.

22. The drill bit according to claim 1, wherein the groove is ring-shaped and is disposed in a plane perpendicular to the axis of rotation.

* * * * *